United States Patent [19]

Lamb et al.

[11] 3,719,539

[45]*March 6, 1973

[54] RADIATION CURING OF UNSATURATED POLYESTER COMPOSITIONS

[75] Inventors: George Edwin Robert Lamb; Dusan Ciril Prevorsek; Hendrikus Johan Oswald, all of Morristown, N.J.

[73] Assignee: Allied Chemical Corporation, New York, N.Y.

[ * ] Notice: The portion of the term of this patent subsequent to July 14, 1987, has been disclaimed.

[22] Filed: Aug. 22, 1969

[21] Appl. No.: 852,459

[52] U.S. Cl. ............. 156/199, 156/272, 204/159.15, 264/236
[51] Int. Cl. ............................................. B29c 25/00
[58] Field of Search ........ 156/272, 199; 204/159.11, 159.15, 204/159.22; 264/236

[56] References Cited

UNITED STATES PATENTS

| | | | |
|---|---|---|---|
| 2,750,320 | 6/1956 | Latham | 156/272 |
| 2,997,419 | 8/1961 | Lawton | 156/272 X |
| 3,188,229 | 6/1965 | Graham | 204/159.11 X |
| 3,439,063 | 4/1969 | Reilly | 204/159.15 X |
| 3,520,750 | 7/1970 | Li et al. | 156/199 |

*Primary Examiner*—Benjamin R. Padgett
*Assistant Examiner*—E. E. Lehmann
*Attorney*—Arthur J. Plantamura

[57] ABSTRACT

A cold-forming method for forming shapes from a laminate which has a thermosetting resinous core and thermoplastic face sheets is disclosed. The thermoplastic face sheets are of sufficient thickness and strength so that the sandwich containing the thermosetting core between the face sheets may be cold formed into shaped articles and such shape as is imparted to it is retained by the thermoplastic face sheets without substantial external constraint on the shape as the thermosetting core is cured by a catalyst system consisting essentially of a peroxide catalyst in conjunction with high energy radiation.

4 Claims, No Drawings

RADIATION CURING OF UNSATURATED POLYESTER COMPOSITIONS

This invention relates to the forming of shaped articles comprising synthetic thermosetting resins. More particularly, the invention relates to the provision of a structure comprising a thermosettable plastic lamina which is supported by or sandwiched between thermoplastic layers or enclosing face sheets to form a composite which may be cold-formed into suitable shapes, and to the novel method of cold-forming shaped articles from said composite and curing the formed articles free of the shaping apparatus by use of high energy radiation in combination with a peroxide catalyst.

The concept of preparing shaped articles at ambient temperatures from laminates that incorporate thermosetting resins and subsequently curing said articles free of external constraint is disclosed in copending U.S. patent application of Li, et al., Ser. No. 604,255 filed Dec. 23, 1966 now U.S. Pat. No. 3,520,750. The present application is an improvement on the invention disclosed in said application and discloses in essence a novel method for effecting a relatively more rapid and less costly cure of the thermosetting resin.

The use of high energy radiation to effect various chemical reactions, including polymerization, is known. However, in using high energy radiation for the curing of laminates consisting of a thermoplastic skin and a cross-linkable polymeric core, it is frequently observed that high radiation dosages required for curing the core may lead to severe discoloration of face sheets and/or appreciable deterioration of mechanical properties. In searching for means which would reduce the radiation dosages required for complete cure of the laminate consisting of a core containing as crosslinkable component, e.g., a mixture of unsaturated polyester and copolymerizable monomers, we have discovered that such an effect can be achieved with unexpected beneficial results by the addition of peroxide-type components in the system to be irradiated.

It is an object of the invention to provide a method for the rapid curing of shaped articles of thermosetting plastic composition using high energy radiation in conjunction with peroxide catalysts.

It is a more specific object of the invention to provide a novel method for the production of thermoset shapes at ambient temperatures using high energy radiation and peroxide catalysts, said method being characterized by a thermosettable layer sandwiched between thermoplastic layers which are of sufficient strength to permit the desired shape imparted to the composite to be retained as the thermosettable layer is converted to the thermoset condition without requiring external constraint.

Additional objects and advantages of the present invention will be apparent from the disclosure which follows.

While a variety of curable thermosetting compositions may be utilized in deriving the benefits of the present invention, the use of the process with unsaturated polyester compositions is especially advantageous.

The term "unsaturated polyester" is used herein to mean the polycondensation products of dicarboxylic acids or dihydrides with dihydroxy alcohols when one of the reactants present during the polycondensation reaction contains non-aromatic unsaturation. Unsaturated polyesters can be modified by the presence in the polycondensation reaction mixture of monocarboxylic acids, monohydroxy alcohols, and small amounts of polycarboxylic acids or polyhydroxy alcohols. Unsaturated polyesters most frequently used are obtained by esterifying saturated dihydric alcohols such as ethylene glycol, diethylene glycol, triethylene glycol, trimethylene glycol, α-propylene glycol, and 1:3-butylene glycol with α-unsaturated α,β-dicarboxylic acids such as maleic, fumaric, itaconic, and citraconic acids. This type of unsaturated polyester resin may be modified by replacing some of the unsaturated dibasic acids with an equivalent quantity of another dicarboxylic acid such as, for example, succinic, adipic, sebacic, phthalic or azelaic acid. Examples of unsaturated monomers capable of copolymerizing with the above-described types of unsaturated polyesters are styrene, methyl methacrylate, ethylene glycol dimethacrylate, ethyl acrylate, acrylonitrile, vinyl acetate, diallyl phthalate, diallyl maleate, and triallyl cyanurate.

A wide range of peroxide catalysts may be incorporated in the curable resin. As such, for example, are benzoyl peroxide, dicumyl peroxide, t-butyl perbenzoate, t-butyl peracetate, t-butyl hydroperoxide, di-tert.-butyl peroxide, t-butyl-cumyl peroxide, diacetyl peroxide, 2,5-dimethyl-2,5-dihydroperoxyhexane, 2-ethoxy-2-(t-butyl-peroxy)-ethane, 3,5,5-trimethyl-3-hydroxy-1,2-dioxolane, 3,5,5-trimethyl-3(t-butyl-peroxy)-1,2-dioxolane, phthalic peroxide, succinic peroxide, benzoyl acetic peroxide, fatty oil acid peroxides, e.g., coconut oil, acid peroxides, lauric peroxide, stearic peroxide, and oleic peroxide, and terpene oxides, e.g., ascaridole.

The peroxide compounds are used in amounts ranging from about 0.05 percent to about 12 percent by weight based on the total weight of the polymeric composition and preferably in amounts of from about 0.1 percent to about 8 percent by weight. It is an essential feature of this invention that the peroxides employed be effective under the influence of the high energy radiation, such as high energy electrons, at temperatures below the activation temperature recommended for the conventional heat-curing process.

The reactions induced in polymers by radiation (or polymerization reactions similarly induced) can be effected by means of either gamma or beta rays. The former are obtained as emanations from a radioactive substance such as the isotope cobalt 60 while the latter being high energy electrons are generally produced by a suitable accelerator. While there is in theory no limit to the dosage of radiation obtainable with either method, since the dosage is proportional to the time of exposure to the radiation, in practice, the higher energy flux of the beam obtained with an electron accelerator makes this the preferred means in commercial application. Dosages of several megarads can be obtained in times of a few seconds with such an accelerator, and dosages of this magnitude can, in fact, be employed for the rapid cure of, for example, mixtures of unsaturated polyesters and styrene.

The advantages of the use of compounds that reduce the radiation dosage for curing are obvious. The reduced discoloration can eliminate costly painting of the cured items and/or other finishing operations. It reduces the time of curing which further improves the economics of the process. Furthermore, the fact that the outer thermoplastic sheets are not severely affected by radiation leads to an over-all improvement in the mechanical properties of the cured composite.

The following examples are illustrative for this invention. It should be understood that the use of peroxide-type additives is not restricted only to the laminates of the invention mentioned above, but should be considered applicable to any polyester resin system which is curable by high energy radiation. Parts are parts by weight unless otherwise expressed.

EXAMPLE 1

A viscous liquid whose composition was
27 parts styrene
73 parts of a relatively high molecular weight polyester resin having a weight average molecular weight of 160,000 and an acid number of 12.5, prepared by reacting the following components:

| propylene glycol | 1.05 mol |
|---|---|
| phthalic anhydride | 0.5 mol |
| maleic anhydride | 0.5 mol |
| glycerol | 0.01 mol |

3 parts benzoyl peroxide was placed between parallel thermoplastic sheets lined with aluminum foil. The sandwich was irradiated with one-half megarad of β-radiation. The foil and thermoplastic sheet were peeled from the cured composition, which had a tensile moldulus of 30,100 psi. A similar composition made in identical manner but with no benzoyl peroxide had a tensile modulus of 2,550 psi.

EXAMPLE 2

A viscous liquid whose composition was
27 parts styrene
73 parts of a relatively high molecular weight polyester resin having a weight average molecular weight of 160,000 and an acid number of 12.5 prepared by reacting the following components:

| propylene glycol | 1.05 mol |
|---|---|
| phthalic anhydride | 0.5 mol |
| maleic anhydride | 0.5 mol |
| glycerol | 0.01 mol |

1 part of benzoyl peroxide was placed between parallel thermoplastic sheets lined with aluminum foil. The sandwich was irradiated with one megarad of β-radiation. The foil and sheet were peeled from the cured composition, which had a tensile modulus of 25,190 psi. A similar composition made in identical manner but with no benzoyl peroxide had a tensile modulus of 12,370 psi.

EXAMPLE 3

A viscous liquid whose composition was
27 parts styrene
73 parts of a relatively high molecular weight polyester resin having a weight average molecular weight of 160,000 and an acid number of 12.5 prepared by reacting the following components:

| propylene glycol | 1.05 mol |
|---|---|
| phthalic anhydride | 0.5 mol |
| maleic anhydride | 0.5 mol |
| glycerol | 0.01 mol |

3 parts of benzoyl peroxide was placed between parallel sheets of a thermoplastic material lined with aluminum foil. The sandwich was irradiated with 1 megarad of β-radiation. The foil and thermoplastic sheet were peeled from the cured composition, which had a tensile modulus of 48,920 psi. A similar composition made in identical manner but with no benzoyl peroxide had a tensile modulus of 12,370 psi.

EXAMPLE 4

A viscous liquid composition of
27 parts of styrene
73 parts of a relatively high molecular weight polyester resin having a weight average molecular weight of 160,000 and an acid number of 12.5 prepared by reacting the following components:

| propylene glycol | 1.05 mol |
|---|---|
| phthalic anhydride | 0.5 mol |
| maleic anhydride | 0.5 mol |
| glycerol | 0.01 mol |

1 part dicumyl peroxide was placed between parallel sheets of a thermoplastic material lined with aluminum foil. The sandwich was irradiated with 1 megarad of β-radiation. The foil and thermoplastic sheets were peeled from the cured composition, which had a tensile modulus of 17,260 psi. A similar composition made in identical manner but with no dicumyl peroxide had a tensile modulus of 12,360 psi.

It will be apparent that various modifications may be effected in the invention by those skilled in the art without departing from the scope or spirit of the invention. The several details disclosed as illustrative should not be construed as placing limitations on the invention except as required by the appended claims.

We claim:

1. A method of forming a synthetic resinous thermosettable laminate composite comprising sandwiching a thermosetting lamina between outer laminae of thermoplastic resin, said composite being of sufficient rigidity to retain the shape imparted to said composite, shaping said composite in a forming apparatus at ambient temperature to the desired shape, said composite being retained in the forming apparatus for a period of time sufficient to shape the thermoplastic layers into the desired shape, removing the shape from the forming apparatus with the thermosetting lamina in a substantially uncured condition, and curing the thermosetting lamina of said composite with the aid of a perioxide catalyst and high energy radiation while said shape is free of external constraint.

2. The method of claim 1, wherein said thermosetting lamina comprises an unsaturated polyester.

3. The method of claim 1, wherein said thermosetting lamina comprises an unsaturated polyester together with a copolymerizable monomer having a

group.

4. The method of claim 3, wherein the copolymerizable monomer is styrene.

* * * * *